US011743122B1

(12) United States Patent
Bayless et al.

(10) Patent No.: US 11,743,122 B1
(45) Date of Patent: Aug. 29, 2023

(54) NETWORK CHANGE VERIFICATION BASED ON OBSERVED NETWORK FLOWS

(71) Applicant: Amazon Technologies, Inc., Seattle, WA (US)

(72) Inventors: Samuel Bayless, Seattle, WA (US); John David Backes, Minneapolis, MN (US); Daniel William Dacosta, Saint Paul, MN (US); Vaibhav Katkade, San Jose, CA (US); Sagar Chintamani Joshi, Redmond, WA (US); Nadia Labai, Redmond, WA (US); Syed Mubashir Iqbal, Seattle, WA (US); Patrick Trentin, Minneapolis, MN (US); Nathan Launchbury, Seattle, WA (US); Nikolaos Giannarakis, Seattle, WA (US); Victor Heorhiadi, Seattle, WA (US); Nick Matthews, Westminster, CO (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/709,068

(22) Filed: Mar. 30, 2022

(51) Int. Cl.
*H04L 41/0869* (2022.01)
*H04L 41/08* (2022.01)
(Continued)

(52) U.S. Cl.
CPC ...... *H04L 41/0869* (2013.01); *H04L 41/0816* (2013.01); *H04L 41/0883* (2013.01);
(Continued)

(58) Field of Classification Search
CPC ............. H04L 41/08–0897; H04L 41/14–149; H04L 63/02–0263
See application file for complete search history.

(56) References Cited

U.S. PATENT DOCUMENTS 8,274,895 B2 * 9/2012 Rahman .............. H04L 41/5019
370/235
9,253,035 B2 * 2/2016 Mann ...................... H04L 45/64
(Continued)

OTHER PUBLICATIONS

International Search Report and Written Opinion dated Jun. 20, 2023 in international application No. PCT/US2023/016477, Amazon Technologies, Inc., pp. 1-12.

*Primary Examiner* — Brendan Y Higa
(74) *Attorney, Agent, or Firm* — Robert C. Kowert; Kowert, Hood, Munyon, Rankin & Goetzel, P.C.

(57) ABSTRACT

A network change verification (NCV) system is disclosed for checking whether a proposed configuration change on a network alters the way that the network controls recently observed network flows. In embodiments, the system builds an observed flow control model (OFCM) from logs of recent flows observed in the network. The OFCM, which may be periodically updated based on newly observed flows, provides a compact representation of how individual network flows were ostensibly controlled by the network. When a proposed configuration change is received, the system analyzes the change against the OFCM to check whether the change will alter how the network controls recently observed flows. If so, the proposed change is blocked, and an alert is generated identifying flows that are affected by the change. The NCV system thus prevents network operators from accidentally making changes on the network that will materially alter the behavior of the network.

20 Claims, 9 Drawing Sheets

(51) Int. Cl.
*H04L 41/22* (2022.01)
*H04L 41/0816* (2022.01)
*H04L 41/14* (2022.01)
*H04L 41/147* (2022.01)
*H04L 9/40* (2022.01)

(52) U.S. Cl.
CPC .......... *H04L 41/145* (2013.01); *H04L 41/147* (2013.01); *H04L 41/22* (2013.01); *H04L 63/0263* (2013.01)

(56) References Cited

U.S. PATENT DOCUMENTS

| | | | |
|---|---|---|---|
| 9,787,558 | B2 | 10/2017 | Singh et al. |
| 9,923,787 | B2 * | 3/2018 | Ngoo ................... H04L 41/0645 |
| 9,929,915 | B2 | 3/2018 | Erickson et al. |
| 10,044,570 | B2 * | 8/2018 | Hinrichs ............. H04L 41/0893 |
| 10,122,829 | B2 | 11/2018 | Saavedra |
| 11,018,937 | B2 * | 5/2021 | Smith ..................... H04L 45/64 |
| 2004/0243369 | A1 * | 12/2004 | Carey ................... H04L 41/145 |
| | | | 703/13 |
| 2005/0169185 | A1 * | 8/2005 | Qiu .......................... H04L 43/08 |
| | | | 370/241 |
| 2009/0046581 | A1 * | 2/2009 | Eswaran ............. H04L 43/0876 |
| | | | 370/230 |
| 2015/0358209 | A1 | 12/2015 | Zhang et al. |
| 2016/0212633 | A1 * | 7/2016 | Flanagan ................ H04W 4/02 |
| 2017/0054602 | A1 | 2/2017 | Byard et al. |
| 2017/0201548 | A1 * | 7/2017 | Kinder ................. H04L 41/145 |
| 2017/0339178 | A1 * | 11/2017 | Mahaffey ............... H04L 41/142 |
| 2017/0359228 | A1 * | 12/2017 | O'Neill .................... G06N 5/02 |
| 2018/0278496 | A1 * | 9/2018 | Kulshreshtha ...... H04L 43/0852 |
| 2018/0309632 | A1 | 10/2018 | Kompella et al. |
| 2018/0309640 | A1 * | 10/2018 | Nagarajan ........... H04L 41/0893 |
| 2019/0124114 | A1 * | 4/2019 | Purushothaman .... H04L 41/145 |
| 2020/0028762 | A1 * | 1/2020 | Sun ........................ H04L 43/04 |
| 2021/0385145 | A1 * | 12/2021 | Kitada ................. H04L 41/145 |
| 2021/0409271 | A1 | 12/2021 | Da Silva et al. |
| 2022/0150128 | A1 * | 5/2022 | Adhav ................. H04L 41/145 |

* cited by examiner

Network Management Console 510

Gateway FW Rules

Network ID: vpc-ABC1234
Firewall ID: fw-EFG3909
Firewall Name: Gateway FW Rules
Verify Changes: [Enable 532]

*control element view 530*

[Inbound] [Outbound]

| Rule Name | Protocol | Port(s) | Source Addr Range |
|---|---|---|---|
| SSH | 6 | 22 | 0.0.0.0/0 |
| HTTP | 6 | 80 | 0.0.0.0/0 |
| HTTPS | 6 | 443 | 0.0.0.0/0 |

[Edit Rules 540]

Network Control Elements
Subnets
Access Control Lists
Route Tables
Load Balancers
Firewalls
  Database FW Rules
  Gateway FW Rules *selected element 522*

*navigation view 520*

*FIG. 5*

Network Management Console 510

Gateway FW Rules – Change Verification Results

| Action | Rule Name | Protocol | Port(s) | Source Addr |
|---|---|---|---|---|
| (Unchanged) | SSH | 6 | 22 | 0.0.0.0/0 |
| Delete | HTTP | 6 | 80 | 0.0.0.0/0 |
| (Unchanged) | HTTPS | 6 | 443 | 0.0.0.0/0 |

Warning 610

The proposed change would cause the following packet flow, seen on March 10, 2022, to be blocked:

eni-239c4f9 – Source 11.22.33.45 – TCP – Port 80
(Click for details)

Cancel 620     Override and Approve 630

Network Control Elements
Subnets
Access Control Lists
Route Tables
Load Balancers
Firewalls
  Database FW Rules
  Gateway FW Rules

*FIG. 6*

Network Management Console 510

Network Control Elements
- Subnets
- Access Control Lists
- Route Tables
- Load Balancers
- Firewalls
- Blocked Network Changes (12)  710

Review Blocked Network Changes

| Action | Control Element | Element Type |
|---|---|---|
| Delete | Gateway Route Table | Route Table |
| Modify | Subnet A ACL | ACL |
| Associate | Subnet B ACL | ACL |
| Modify | Gateway FW Rules | Firewall |

Warning 720

The proposed change was prevented because the new setting would allow a packet flow that was previously blocked, seen on March 12, 2022:

eni-5442ac43d – Source 54.22.33.88 – TCP – Port 80
(Click for details)

[Prev]  [Approve Change]  [Reject Change]  [Next]

*FIG. 7*

NETWORK CHANGE VERIFICATION BASED ON OBSERVED NETWORK FLOWS

BACKGROUND

Cloud-based service provider networks are often used to host virtual private networks on behalf of clients to implement sophisticated cloud-based applications. A virtual private cloud (VPC) (also referred to as a virtual network (VNet), virtual private network, or virtual cloud network, in various implementations) is a custom-defined, virtual network within another network, such as a cloud provider network. A VPC can provide the foundational network layer for a cloud service, for example a compute cloud or an edge cloud, or for a customer application or workload that runs on the cloud. A VPC can be defined by at least its address space, internal structure (e.g., the computing resources that comprise the VPC, security groups), and transit paths. A VPC can be dedicated to a particular customer account (or set of related customer accounts, such as different customer accounts belonging to the same business organization). A VPC is logically isolated from other virtual networks in the cloud. Customers can launch resources, such as compute instances, into their VPC. Customers can have substantial flexibility with respect to the networking configuration details within their VPCs.

BRIEF DESCRIPTION OF THE DRAWINGS

FIG. 5 illustrates a user interface of a network management system that allows a user to submit network change requests and enable network change verification, according to some embodiments.

FIG. 6 illustrates a user interface of the network management system that displays a warning for a network change request issued by the NCV system, according to some embodiments.

FIG. 7 illustrates a user interface of the network management system that allows a user to review a list of network changes blocked by the NCV system, according to some embodiments.

Figure 1:
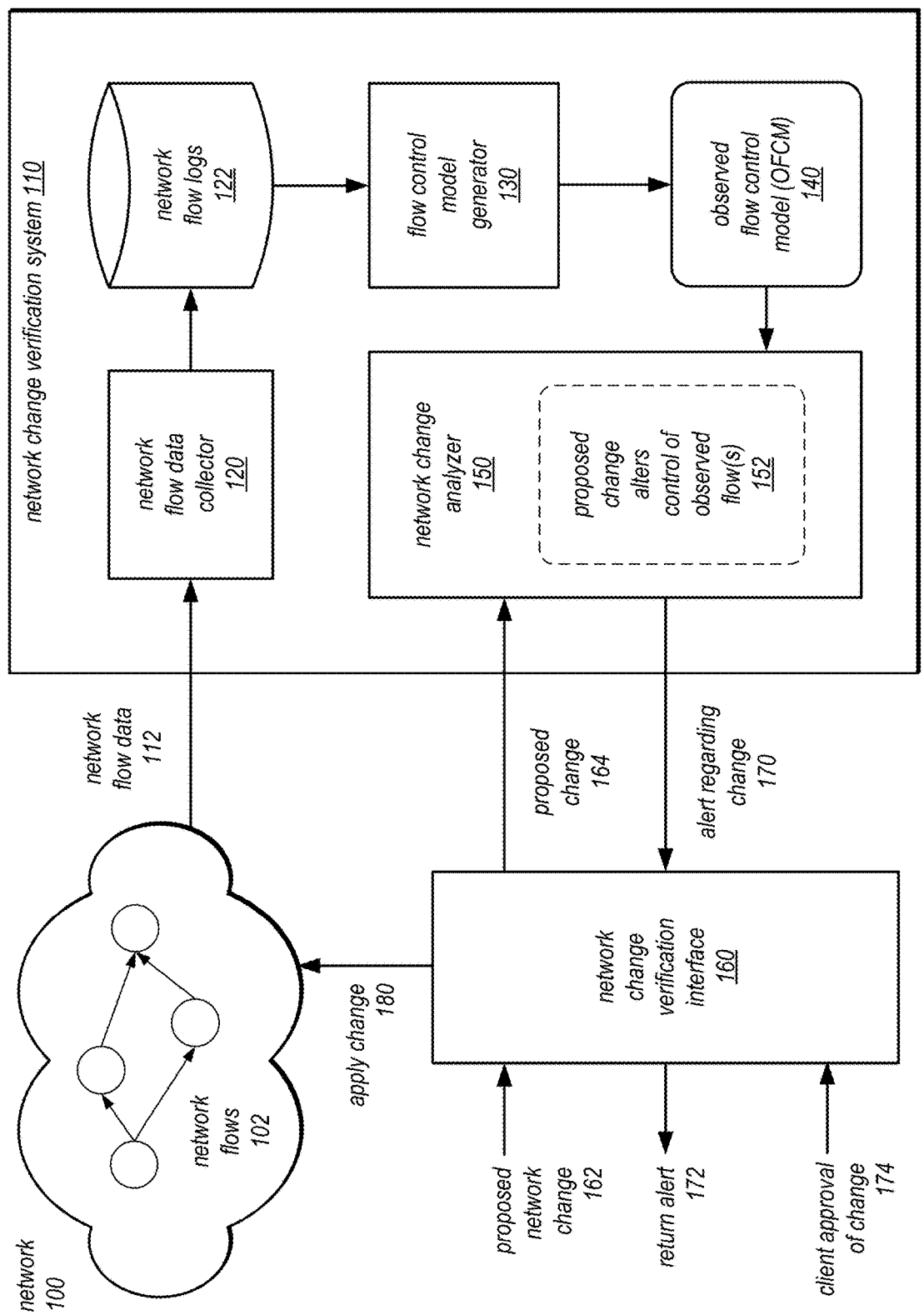
FIG. 1 illustrates a network change verification (NCV) system that analyzes network configuration changes to a computer network for unexpected impacts on observed network flows, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

The present disclosure relates to techniques for a cloud provider to assist its customers with managing their virtual networks, and more specifically to a new VPC feature that can automatically detect and prevent changes to customer VPC network configurations that could cause unintended customer network outages. Cloud-based service provider networks are often used to host virtual private networks on behalf of clients to implement sophisticated cloud-based applications. Sometimes, when a user makes a change to the configuration of a network, the user may intend to alter the way that traffic in the network is controlled. In other situations, users may make network changes that are not intended to alter existing traffic controls in their network, for example, to clean up unused network resources, or to close a potential security vulnerability. However, users making such changes may not have a full understanding of how these changes will impact existing application traffic in the network. A seemingly beneficial change can cause an incorrect blocking or rerouting of important application traffic in the network, in some cases leading to an outage of the customer's application. The problem is especially prominent in large-scale networks that implement highly complex network controls and where network administrative responsibilities are shared by multiple individuals.

To address these and other problems in current network management systems, this disclosure describes techniques for checking proposed network configuration changes (e.g. a change to a firewall, routing table, or load balancer policy) to automatically detect and prevent changes that could alter existing network traffic and cause unintended network outages. In some embodiments, the disclosed techniques are implemented by a network change verification (NCV) system, which combines static and dynamic network flow analysis to determine whether a proposed change would redirect or block any recently observed application traffic in the network. In some embodiments, the NCV system builds and maintains an observed flow control model (OFCM) from logs of recent flows observed in the network. The OFCM, which may be periodically updated based on newly observed flows, provides a compact representation of how individual network flows were ostensibly controlled by the network. When a proposed configuration change is received, the system analyzes the change using the OFCM to determine whether the change will alter how the network controls any recently observed flows. If so, the proposed change may be blocked from deployment, and an alert is generated identifying flows that are affected by the change. With this change verification feature enabled, network owners can safely make changes to the network with the knowledge that any potentially breaking changes will be identified before they are deployed in the network.

In some embodiments, the NCV system works by analyzing flow logs (e.g. records of TCP/IP packets) collected from the network. When a user is about to make a configuration change to a network resource, such as a route table or firewall, the NCV system statically analyzes that change before it is applied, and determines if the proposed change would alter the way any traffic observed in recent flow logs is handled (e.g. blocked, re-routed, etc.) For example, if a user proposes to introduce a firewall rule that would block port 80, the NCV system will examine the flow logs for a recent period (e.g. the last 30 days), and determine if any of the packets from those logs that were previously accepted by that firewall used port 80. If not, the change will be deemed safe and allowed to be deployed. On the other hand, if the system determines that a recently observed packet from the flow logs would have been blocked by the change, the system will temporarily prevent the change. In some embodiments, the change may be identified in a warning or alert, along with an example flow that would have been impacted by the change. In this way, the user will have an opportunity to more closely review the change before proceeding with deployment.

For some large networks, flow logs can consist of vast quantities of data, such that direct analysis of the raw logs themselves would be too slow or computationally expensive to provide real time alerts to the network management control plane. In some cases, iterating through each of the recorded packet logs and analyzing each one to determine if it would be blocked or re-routed by a proposed change would be infeasible. Accordingly, some embodiments of the NCV system will preprocess the flow logs and convert the logs into a more compact and symbolic representation, which can be used to perform the verification more quickly. This representation of the network flows, which may be termed an observed flow control model (OFCM) of the network, can be encoded in a variety of ways, such as a logical formula, a constraint program, or a Reduced Ordered Binary Decision Diagram. The NCV system may use a constraint solver or a series of Binary Decision Diagram operations to determine if packets in the flow log records would be altered by the proposed change without needing to examine each of the recorded packets individually.

In some embodiments, although the process of converting the flow logs into the OFCM may take substantial compute time and memory, the ongoing cost of updating the representation can be relatively minor, and incurred only occasionally (e.g. once per day). The resulting representation can then be saved and re-used to verify any future network configuration changes without re-computing the full representation each time.

As will be appreciated by those skilled in the art, the disclosed techniques may be implemented by computer systems (e.g. network management systems) to solve current technical problems in the state of the art and to improve the functioning of the computer systems. These and other features and advantages of the disclosed techniques are discussed in further detail below, in connection with the figures.

FIG. 1 illustrates a network change verification (NCV) system that analyzes network configuration changes to a computer network for unexpected impacts on observed network flows, according to some embodiments.

As shown, the figure depicts a network change verification system 110. In some embodiments, the NCV system 110 may be implemented as part of a network management system configured to make and deploy changes to a computer network 100. In some embodiments, the NCV system 110 may be implemented separately from the network management system. For example, the NCV system may be used to verify network changes produced by a third-party network orchestration system, as the changes are being designed or deployed.

As shown, the network 100 may observe network flows 102 over time. Network flow data 112 (e.g. metadata about the network flows 102) may be captured by a network flow data collector component 120 and stored as network flow logs 122. In some embodiments, the network flow data collector 120 and the network flow logs repository 122 may be implemented separately from the NCV system 110.

The network flow logs 122 may comprise time-sequenced log records. In some embodiments, each log record may indicate data about a particular network flow (e.g. an sequence of IP packets sent or received by a network interface in the network). In some embodiments, the log records may be generated periodically at specific times, and the data in the log records are aggregated within specific time windows. In some embodiments, individual log records will indicate the source and/or destination network interface(s) of a flow, the source and destination IP addresses, and the source and destination ports. In some embodiments, the log record may include metadata such as the type of protocol associated with the flow, the number of packets and/or bytes transmitted in the flow, and the start and end times of the flow. Additionally, in some embodiments, the log record may indicate an action performed on the flow by the network element attached to the network interface, for example, whether the flow was accepted or rejected by the network element. In some embodiments, the manner in which the network flow data 112 is captured and logged may be configurable via a configuration interface of the network flow data collector 120.

In some embodiments, the NCV system 110 implements a flow control model generator 130. The generator 130 is tasked with preprocessing the network flow log 122 and converting the log records into a compact summary data structure 140 that can be used by NCV system 110 to easily and quickly verify the proposed network changes. In some embodiments, this summary data structure, which may be termed an observed flow control model (OFCM) 140, will indicate how the observed network flows 110 are ostensibly controlled by the network (e.g. whether individual flows are allowed or blocked, how individual flows are routed or distributed for load balancing, etc.). The OFCM 140 may indicate, for each observed network flow, one or more actions taken on the flow in the network (accepted or blocked), etc.

In some embodiments, the OFCM 140 may be encoded in a symbolic form such as a logical formula. For example, the logical formula may be a Binary Decision Diagram (BDD). A Binary Decision Diagram or branching program is a compressed representation of a Boolean function. A BDD may be seen as a directed acyclic graph where each transition is a logical operation (e.g. a conjunction, disjunction, or negation). The end nodes on the graph are true/false values. In the present context, the BDD may be used to map the space of network flows (defined by different flow attributes) to different control outcomes. For example, a BDD may be used to indicate what types of flow are accepted or blocked by a firewall in the network. BDDs can be easily updated based on newly observed flow data.

In some embodiments, the logical formula may be encoded as a constraint program. A constraint program may be specified as a set of constraints on a feasible solution for a set of decision variables. A constraint solver may then be used to generate the solution space from the constraints. In this context, the observed network flows and control outcomes may be specified as constraint rules, and the constraint solver can be used to solve the observed constraint rules to generate the constraint program to indicate what types of flows will lead to what control outcomes. As with BDDs, the constraint program can be easily updated periodically by re-running the solver on newly observed flow data.

In some embodiments, the OFCM 140 may indicate a mapping between all observed network flows and their respective control outcomes. For example, the OFCM may comprise a lookup table (e.g. a hash table) that maps each combination of observed flow attributes (e.g. source and destination addresses and port numbers, etc.) to their observed control outcomes. Flows with the same flow attributes but observed at different times may be merged. In some embodiments, in order to restrict the size of the lookup table, a probabilistic data structure such as a Bloom filter may be used. For example, some of the observed flows may be added to an "allowed" Bloom filter, while others are added to a "blocked" Bloom filter.

In some embodiments, the model generator 130 may periodically update the OFCM 140 to incorporate new flow data from the network. In some embodiments, the OFCM 140 may be updated to "forget" old flow data, so that the OFCM 140 will only reflect flows that were observed within a recent time period (e.g. in the last 30 days). Moreover, in some embodiments, the model generator 130 may be configured to specifically include or exclude flows from certain time periods, or flows observed by certain network elements or network interfaces. In some embodiments, these parameters of the model generator 130 may be configurable via a configuration interface of the NCV system 110.

As shown, in some embodiments, a network change verification interface 160 may be configured to receive a proposed network change 162 on the network 100. The network change verification interface 160 may be a user interface such as a graphical user interface (GUI), or a programmatic interface such as an application programming interface (API) or service interface. In some embodiments, the network change verification interface 160 may be implemented as part of the NCV system 110. In some embodiments, the verification interface 160 may be implemented by a larger network management system or a separate network orchestration system. In some embodiments, the network change verification interface may be implemented as part of a network change analysis software that allows a user to ask the NCV system whether a particular change or changes to the network will alter how observed network flows are controlled in the network. The network change analysis software may interact with the NCV system 110 through an API, and the proposed network change 162 and return alert 172 are sent and received according to the API.

As shown, the network change verification interface 160 may forward the proposed change 164 to a network change analyzer component 150 of the NCV system 110. The network change analyzer 150 will use the current OFCM 140 to check 152 whether the proposed change 164 will alter how observed flows will be controlled by the network. In some embodiments, the network change analyzer 150 will not use the raw network flow logs 122 to perform the analysis. Rather, the analyzer 150 will only rely on the OFCM 140 as a representation of the flow control behavior of the network. In some embodiments, if the proposed change 164 is determined 152 to alter the flow control behavior of the network, an alert 170 will be generated substantially in real time.

In some embodiments, to make the determination 152 that the proposed change will alter the control of observed flows in the network, the network change analyzer 150 will reduce the proposed change to the same form as the OFCM 140. For example, a new firewall configuration may be converted into a second logical formula or mapping function that maps the network flow space into resulting control actions. The analyzer 150 may then compare the solution spaces produced by the proposed change and the OFCM. If the two solution spaces are different, the analyzer may then check to see if any of the observed network flows fall within the difference. In some embodiments, only a subset of the observed flows may be checked during the analysis (e.g. only those flows that were seen at the network interface in question).

As shown, if an alert 170 regarding the proposed change is raised by the NCV system 110, the alert may be returned to the client via the verification interface. In some embodiments, alert 172 may be returned as a visual warning displayed on a GUI. The GUI may be the interface where the proposed change 164 was submitted. In some embodiments where the verification interface 160 is a programmatic interface, the alert 172 may be indicated as a returned error code. In either case, the proposed change 164 (if submitted for deployment) may be blocked or prevented. In some embodiments, the returned alert 172 may indicate that the proposed change will impermissibly alter the control behavior of the network based on recently observed network flows. The returned alert 172 may also identify one or more observed network flows that are impacted by the proposed change.

As shown, in some embodiments, the verification interface 160 may be configured to receive a client approval 174 of the proposed change after the warning. This approval may override the blocking of the proposed change, so that the change will be applied 180 to the network 100. Nonetheless, this back-and-forth interaction with the client ensures that the client is proceeding with the full understanding that the requested change will impact observed traffic flows in the network. In this manner, the NCV system is able to prevent users from unwittingly making network changes that will break existing flow control behaviors of the network.

Figure 2:
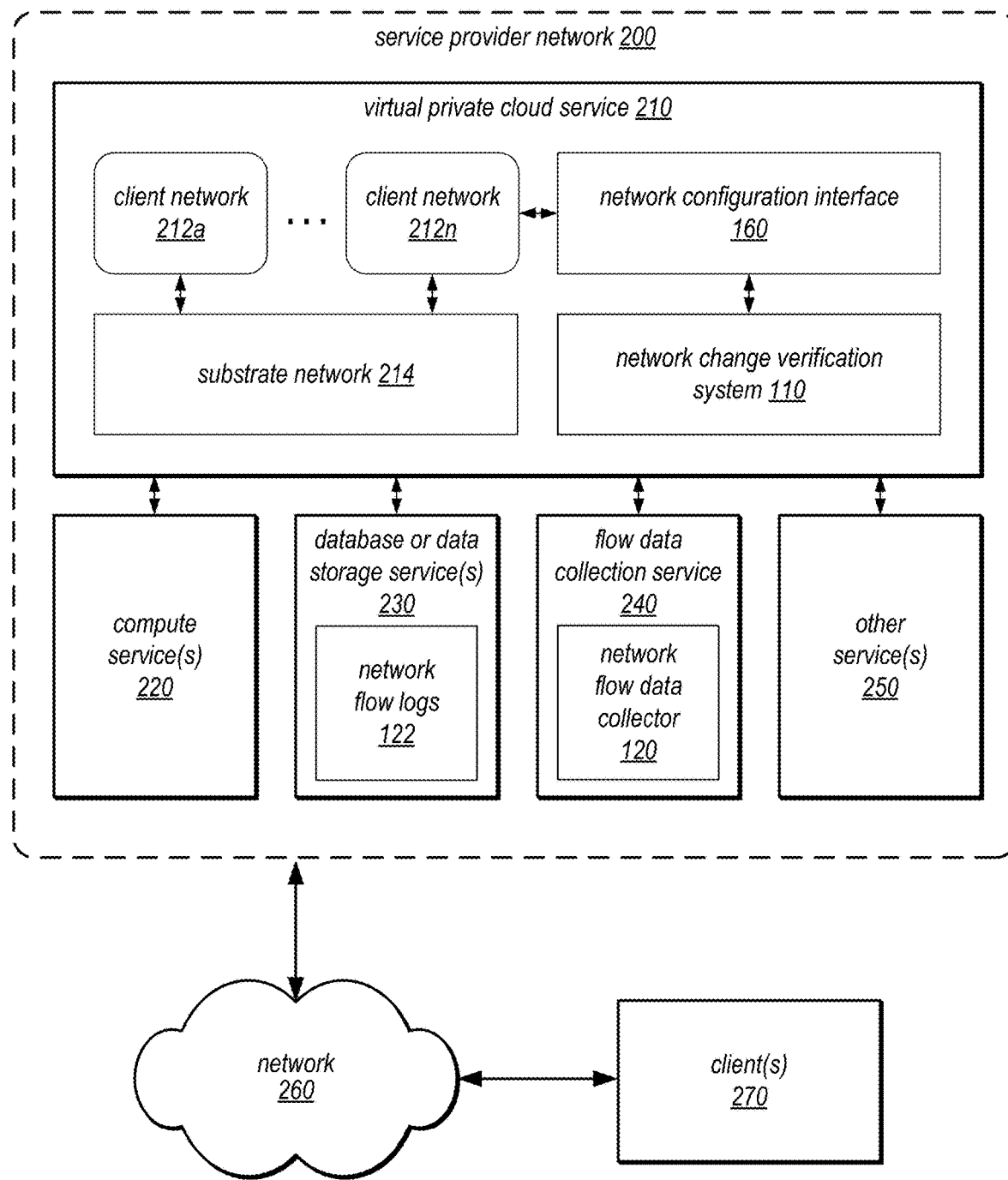
FIG. 2 illustrates a cloud-based service provider network that implements a virtual private cloud (VPC) service and the NCV system, according to some embodiments.

FIG. 2 illustrates a cloud-based service provider network that implements a virtual private cloud (VPC) service and the NCV system, according to some embodiments.

The service provider network 200 can be a cloud provider network in some implementations. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a separate geographical area in which the cloud provider clusters data centers. In many cases, each region represents a geographic area (e.g., a U.S. East region, a U.S. West region, an Asia Pacific region, and the like) that is physically separate from other regions. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs). In some implementations, the cloud provider network can include one or more cellular networks (such as a private 5G network) managed and provided by the cloud provider. This compartmentalization and geographic distribution of computing hardware enables the cloud provider network to provide low-latency resource access to customers on a global scale with a high degree of fault tolerance and stability.

In some embodiments, provider network 200 may implement various computing systems, services, resources, or services, such as a virtual private cloud (VPC) service, one or more compute service(s) 220, one or more database or data storage service(s) 230, a flow data collection service 240, as well as other services 250. The resources required to support the operations of such services (e.g., compute and storage resources) may be provisioned in an account associated with the cloud provider, in contrast to resources requested by users of the cloud provider network, which may be provisioned in user accounts.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 10 and described below. In various embodiments, the functionality of a given system or service component (e.g., a component of data storage service 230) may be implemented by a particular node or may be distributed across several nodes. In some embodiments, a given node may implement the functionality of more than one service system component (e.g., more than one data store component).

The compute service(s) 220 may be implemented by service provider network 200 to offer instances, containers, and/or functions according to various configurations for client operations. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A container may provide a virtual operating system or other operating environment for executing or implementing applications. A function may be implemented as one or more operations that are performed upon request or in response to an event, which may be automatically scaled to provide the appropriate number computing resources to perform the operations in accordance with the number requests or events. A number of different types of computing devices may be used singly or in combination to implement the compute instances, containers, and/or functions of service provider network 200 in different embodiments, including general purpose or special purpose computer servers, storage devices, network devices and the like.

Compute instances, containers, and/or functions may operate or implement a variety of different services, such as application server instances, general purpose or special-purpose operating systems, services that support various interpreted or compiled programming languages such as Ruby, Perl, Python, C, C++ and the like, or high-performance computing services) suitable for performing client applications, without for example requiring the client(s) 270 to access an instance. Applications (or other software operated/implemented by a compute instance and may be specified by client(s), such as custom and/or off-the-shelf software.

In some embodiments, compute instances, containers, and/or functions have different types or configurations based on expected uptime ratios. The uptime ratio of a particular compute instance may be defined as the ratio of the amount of time the instance is activated, to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and pay a discounted hourly usage fee in accordance with the associated pricing policy. If the client expects to have a steady-state workload that requires an instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Compute instance configurations may also include compute instances, containers, and/or functions with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, containers, and/or functions, such as a particular number of virtual CPU cores, memory, cache, storage, as well as any other performance characteristic. Configurations of compute instances, containers, and/or functions may also include their location, in a particular data center, availability zone, geographic location, etc. and (in the case of reserved compute instances, containers, and/or functions) reservation term length.

To implement the VPC service 120, the service provider network 210 may implement a physical or substrate network 214 (e.g., sheet metal boxes, cables, rack hardware) referred to as the substrate. The substrate 214 can be considered as a network fabric containing the physical hardware that runs the services of the provider network, and can include networking devices such as routers, switches, network address translators (NATs), and so on, as well as the physical connections among the devices. The substrate 214 may be logically isolated from the rest of the service provider network, for example it may not be possible to route from a substrate network address to an address in a production network that runs services of the service provider, or to a customer network that hosts customer resources.

The VPC service 210 may implement one or more client networks 212a-n as overlay networks of virtualized computing resources (e.g., compute instances provided by the compute service(s) 220, block store volumes, data objects such as snapshots and machine images, file storage, databases provided by the database or data storage service(s) 230) that run on the substrate 214. In at least some embodiments, hypervisors or other devices or processes on the network substrate may use encapsulation protocol technology to encapsulate and route network packets (e.g., client IP packets) over the network substrate 214 between client resource instances on different hosts within the provider network. The encapsulation protocol technology may be used on the network substrate 214 to route encapsulated packets (also referred to as network substrate packets) between endpoints on the network substrate via overlay network paths or routes. The encapsulation protocol technology may be viewed as providing a virtual network topology overlaid on the network substrate. As such, network packets can be routed along the substrate network according to constructs in the overlay network (e.g., VPCs, security groups). A mapping service can coordinate the encapsulation and routing of these network packets. The mapping service can be a regional distributed look up service that maps the combination of overlay IP and network identifier to substrate IP so that the distributed substrate computing devices can look up where to send packets.

To illustrate, each physical host can have an IP address in the substrate network. Hardware virtualization technology can enable multiple operating systems to run concurrently on a host computer, for example as virtual machines on the host. A hypervisor, or virtual machine monitor, on a host allocates the host's hardware resources amongst various virtual machines on the host and monitors the execution of the virtual machines. Each virtual machine may be provided with one or more IP addresses in the overlay network, and the virtual machine monitor on a host may be aware of the IP addresses of the virtual machines on the host. The virtual machine monitors (and/or other devices or processes on the network substrate) may use encapsulation protocol technology to encapsulate and route network packets (e.g., client IP packets) over the network substrate between virtualized resources on different hosts within the cloud provider network. The encapsulation protocol technology may be used on the network substrate to route encapsulated packets between endpoints on the network substrate via overlay network paths or routes. The encapsulation protocol technology may be viewed as providing a virtual network topology overlaid on the network substrate. The encapsulation protocol technology may include the mapping service that maintains a mapping directory that maps IP overlay addresses (public IP addresses) to substrate IP addresses (private IP addresses), which can be accessed by various processes on the service provider network for routing packets between endpoints.

In some embodiments, at least a subset of virtualization management tasks may be performed at one or more offload cards coupled to a host so as to enable more of the processing capacity of the host to be dedicated to client-requested compute instances—e.g., cards connected via PCI or PCIe to the physical CPUs and other components of the virtualization host may be used for some virtualization management components. Such an offload card of the host can include one or more CPUs that are not available to customer instances, but rather are dedicated to instance management tasks such as virtual machine management (e.g., a hypervisor), input/output virtualization to network-attached storage volumes, local migration management tasks, instance health monitoring, and the like. The offload card can function as a network interface card (NIC) of a host in some implementations, and can implement encapsulation protocols to route packets.

As shown, in some embodiments, the network change verification system 110 of FIG. 1 may be implemented as part of the VPC service 210. The VPC service 210 may provide the network change verification interface 160 to clients (e.g. as a web-based GUI). In some embodiments, this interface allows clients to make network configuration changes to the client networks 212a-n. In some embodiments, the interface may be implemented as a part of a network change analysis tool that allows users to experiment with changes in the network and ask whether a particular change will alter how observed flows are controlled in the network. In some embodiments, the NCV system 110 may be accessed by other services of the service provider network 200 (e.g. via an API) to programmatically verify proposed changes to the client networks 212a-n.

In various embodiments, database services 230 may be various types of data storage and processing services that perform general or specialized data storage and processing functions (e.g., analytics, big data querying, time-series data, graph data, document data, relational data, non-relational data, structured data, semi-structured data, unstructured data, or any other type of data processing operation) over data that is stored across multiple storage locations, in some embodiments. For example, in at least some embodiments, database services 230 may include various types of database services (e.g., relational) for storing, querying, and updating data. Such services may be enterprise-class database systems that are scalable and extensible. Queries may be directed to a database in database service(s) 230 that is distributed across multiple physical resources, as discussed below, and the database system may be scaled up or down on an as needed basis, in some embodiments. The database system may work effectively with database schemas of various types and/or organizations, in different embodiments. In some embodiments, clients/subscribers may submit queries or other requests (e.g., requests to add data) in a number of ways, e.g., interactively via an SQL interface to the database system or via Application Programming Interfaces (APIs). In other embodiments, external applications and programs may submit queries using Open Database Connectivity (ODBC) and/or Java Database Connectivity (JDBC) driver interfaces to the database system.

In some embodiments, database service(s) 230 may include services that process requests to data that is not stored in fully structured storage (e.g., non-relational or NoSQL databases). Database services 230 may access the data that is semi-structured or not-structured in storage, such as data objects of unstructured or semi-structured data in a separate data storage service, in one embodiment. In other embodiments, database services 230 may locally store, manage, and access semi-structured or not-structured data.

In some embodiments, database services 230 may implement various types of data processing services to perform different functions (e.g., query or other processing engines to perform functions such as anomaly detection, machine learning, data lookup, or any other type of data processing operation). For example, in at least some embodiments, database services 230 may include a map reduce service that creates clusters of processing nodes that implement map reduce functionality over data stored in one of the data storage services. Various other distributed processing architectures and techniques may be implemented by database services 230 (e.g., grid computing, sharding, distributed hashing, etc.).

In various embodiments, data storage service(s) 230 may implement different types of data stores for storing, accessing, and managing data on behalf of clients 270 as a network-based service that enables clients 270 to operate a data storage system in a cloud or network computing environment. For example, one data storage service 230 may be implemented as a centralized data store so that other data storage services may access data stored in the centralized data store for processing and or storing within the other data storage services, in some embodiments. Such a data storage service 230 may be implemented as an object-based data store, and may provide storage and access to various kinds of object or file data stores for putting, updating, and getting various types, sizes, or collections of data objects or files. Such data storage service(s) 230 may be accessed via programmatic interfaces (e.g., APIs) or graphical user interfaces. A data storage service 230 may provide virtual block-based storage for maintaining data as part of data volumes that can be mounted or accessed similar to local block-based storage devices (e.g., hard disk drives, solid state drives, etc.) and may be accessed utilizing block-based data storage protocols or interfaces, such as internet small computer interface (iSCSI).

As shown, in some embodiments, the network flow logs 122 may be stored in a database or data store provided by a database or data storage service 230. In some embodiments, other data used by the NCV system 110 may also be stored using the database or data storage service(s) 230. For example, the OFCM 140 or various types of configuration data used by the NCV system, may be stored in such services.

As shown, in some embodiments, the network flow data collector 120 may be implemented by a flow data collection service 240. The network flow data collection service 240 may periodically sweep the different client networks 212a-n to collect flow logs generated by the client networks and store the logs in the database or data storage service 230. In some embodiments, the flow data collection service 240 may be implemented as part of a larger metrics collection service that is configurable to collect a variety of metadata from the client networks, including network usage and health metrics and metrics about individual client resources running in the client networks.

Generally speaking, clients 270 may encompass any type of client configurable to submit network-based requests to service provider network 200 via network 260. For example, a given client 270 may include a suitable version of a web browser, or may include a plug-in module or other type of code module that may execute as an extension to or within an execution environment provided by a web browser. Alternatively, a client 270 may encompass an application such as a database application (or user interface thereof), a media application, an office application or any other application that may make use of resources in in service provider network 200 to implement various features, systems, or applications. (e.g., to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 270 may be an application that interacts directly with service provider network 200. In some embodiments, client 270 may generate network-based services requests according to a Representational State Transfer (REST)-style network-based services architecture, a document- or message-based network-based services architecture, or another suitable network-based services architecture.

In some embodiments, a client 270 may provide access to service provider network 200 to other applications in a manner that is transparent to those applications. For example, client 270 may integrate with an operating system or file system to provide storage on one of data storage service(s) 230 (e.g., a block-based storage service). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service(s) 230 may be coordinated by client 270 and the operating system or file system on behalf of applications executing within the operating system environment. Note that in some embodiments, clients may instead (or also be) implemented as part of a service or other resource of service provider network 200 (e.g., a compute instance, container, or function provided by the compute service(s) 220).

Clients 270 may convey network-based services requests (e.g., materialized view creation requests) to and receive responses from service provider network 200 via network 260. In various embodiments, network 260 may encompass any suitable combination of networking hardware and protocols necessary to establish network-based-based communications between clients 270 and service provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, a given client 270 and service provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 270 and the Internet as well as between the Internet and service provider network 200. It is noted that in some embodiments, clients 270 may communicate with service provider network 200 using a private network rather than the public Internet.

Figure 3:
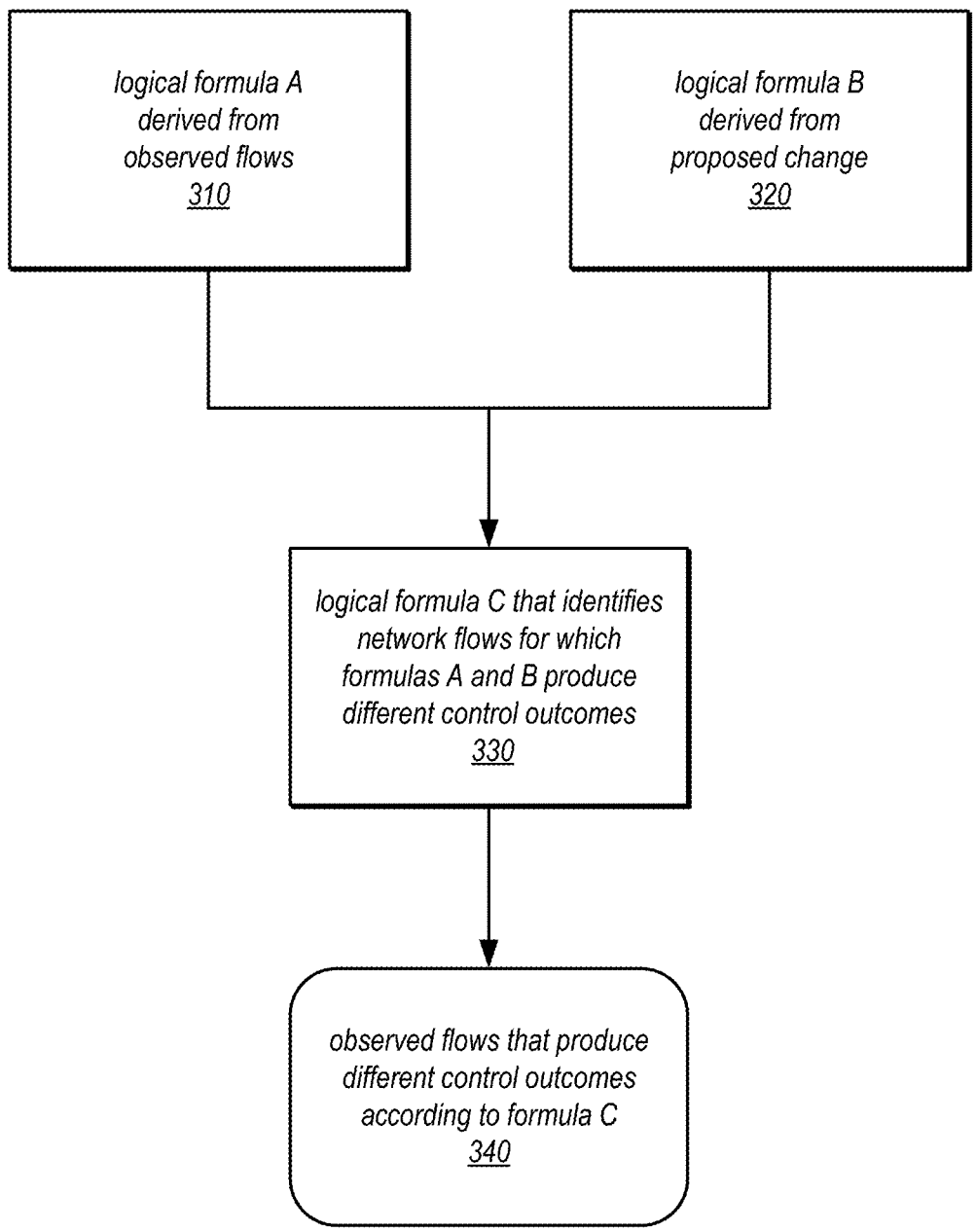
FIG. 3 illustrates an analysis performed by the NCV system to determine whether a proposed network change will impact observed network flows, according to some embodiments.

FIG. 3 illustrates an analysis performed by the NCV system to determine whether a proposed network change will impact observed network flows, according to some embodiments.

As shown, in this example, the control behavior of the network on observed network flows is reduced to a logical formula A 310. In some embodiments, logical formula A may be the OFCM 140 discussed in connection with FIG. 1, which may be periodically updated to reflect the observed control behavior of the network. As discussed, logical formula A may be encoded as a Binary Decision Diagram or a constraint program.

As shown, during the analysis process, the proposed network change may also be reduced to a logical formula B 320, which may be in the same symbolic form as logical formula A 310. Formula B may be generated by parsing and/or interpreting the proposed change (e.g. a change to one or more firewall rules).

In some embodiments, the two formulas may be logically combined (e.g. using a constraint solver) to generate a logical formula C 330. Logical formula C may indicate the space of network flows that map to different control outcomes under formula A and formula B. That is, logical formula C may be used to evaluate network flows and identify those flows where formulas A and B produce different control outcomes. For example, if the two logical formulas A and B map network flows to an allow action or a block action at a firewall, the two formulas may be logically analyzed using software tools to determine the subset of network flows (e.g. source and destination address ranges, etc.) that produce different control outcomes under the two formulas.

As shown, the NCV system can then identify which (if any) of the observed network flows fall within the difference space of formulas A and B (i.e., produce different control outcomes according to logical formula C 330). If no observed network flows fall within the difference space, the NCV system may assume that the proposed change does not alter any observed traffic in the network. That is, even though the two logical formulas A and B are not 100% logically equivalent, there was no actual example of an observed flow that would have exhibited the difference between the two formulas. On the other hand, if there are some observed flows 340 that fall within the difference space, these flows may be considered examples of impacted flows. In that case, the proposed change may be blocked from deployment, and the impacted flows may be identified in the generated alert 172.

Figure 4:
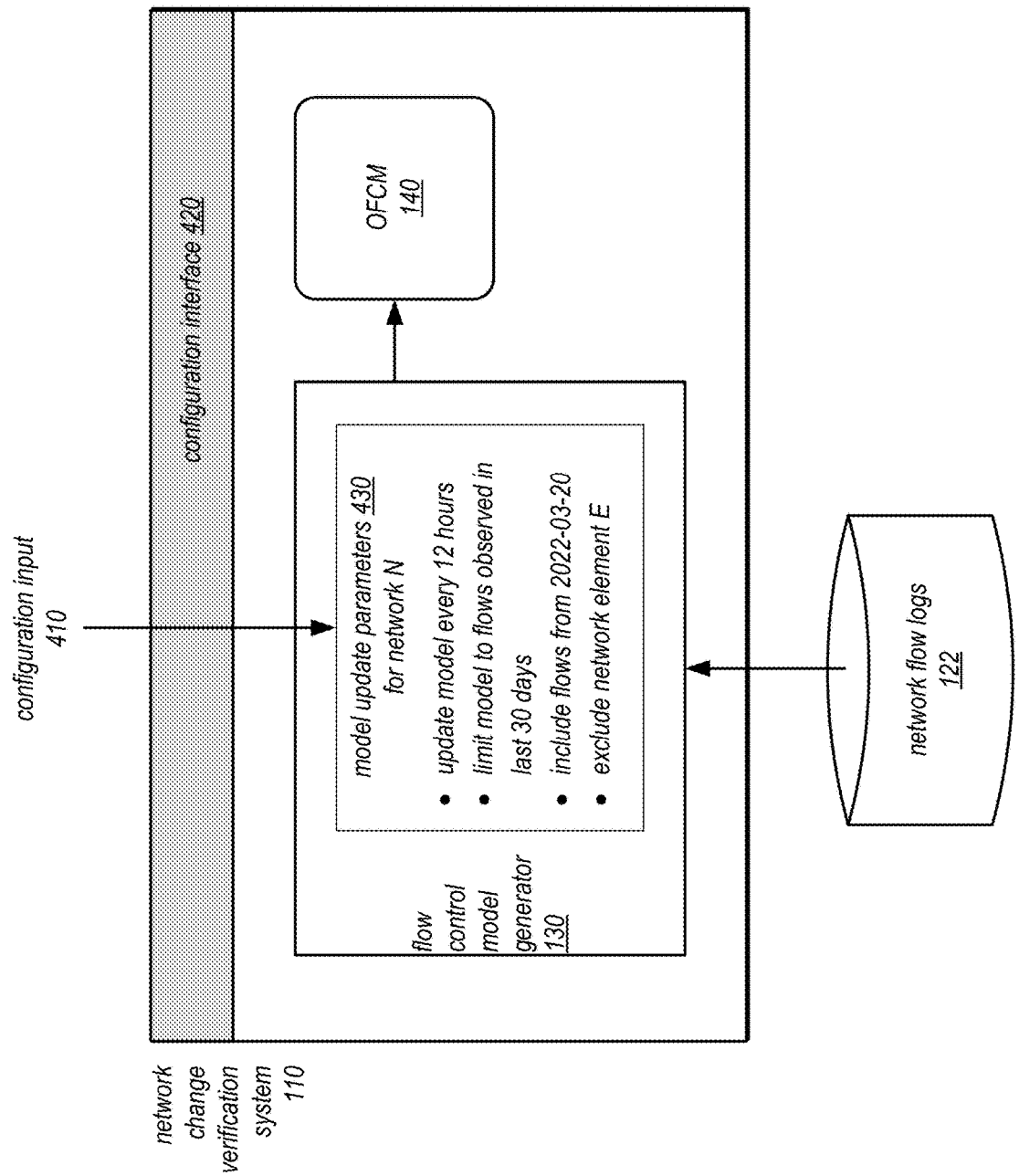
FIG. 4 illustrates a configuration interface of the NCV system that issued to configure how the observed flow control model is updated, according to some embodiments.

FIG. 4 illustrates a configuration interface of the NCV system that is used to configure how the observed flow control model is updated, according to some embodiments.

As shown, in some embodiments, the NCV system 110 may expose a configuration interface 420 that allows operators of the NCV system to supply configuration input 410 to control how the OFCM 140 is updated using the network flow logs 122. In some embodiments, the configuration interface 420 may be a user interface such as a GUI or a browser-based interface. In some embodiments, the configuration interface 420 may be a programmatic interface that can be invoked by other software components. In some embodiments, the configuration input 410 may be specified in one or more configuration files that can be loaded by the NCV system 110.

As shown, the configuration input 410 may define various model update parameters 430 that control how the flow control model generator 130 updates the OFCM 140 for a particular network N. These parameters 430 may vary for different networks. In some embodiments, the update parameters 430 may specify the timing of the updates. For example, the parameters may specify how often the OFCM is updated with new flow data (e.g. every 12 hours), or how large a time window should be represented by the OFCM (e.g. a period of 30 days). In some embodiments, the configuration parameters may specify that flow data from a specific time period should be included or excluded from the OFCM. In some embodiments, the configuration parameters may specify to include or exclude flow data encountered by a particular network element E, so that the verification process will only check the control behavior of desired control elements. In some embodiments, at least some of the control parameters 430 may be self-adjusting based on runtime conditions. For example, a network N that observes a spike in the amount of network traffic may responsively increase the model update frequency.

FIG. 5 illustrates a user interface of a network management system that allows a user to submit network change requests and enable network change verification, according to some embodiments.

As shown, the user interface is a graphical network management console 510, which allows a user to submit network configuration changes for a network (here network ID vpc-ABC1234). The console 510 is divided into a navigation view 520 and a control element view 530. The navigation view 520 allows the user to select different network control elements implemented in the network, and the control element view 530 shows various properties of the selected control element. In this example, the user has selected a firewall element "Gateway FW Rules" 522 in the navigation view.

As shown, the control element view 530 includes an enable button 532. This button may be used to enable network change verification for the selected control element, so that the NCV system will automatically verify all changes submitted to the control element using recently observed network flows. For example, when the verification feature is enabled, any changes to the inbound firewall rules shown in the rules table (e.g. changes made via the edit button 540) will be verified to identify any unexpected impacts on recent network flows. In this example, the verification feature may be enabled and disabled for just individual control elements in the network.

FIG. 6 illustrates a user interface of the network management system that displays a warning for a network change request issued by the NCV system, according to some embodiments.

FIG. 6 illustrates a subsequent state of the network management console 510 of FIG. 5, after the user has made a change to one of the firewall rules. As shown, the user has attempted to delete one of the firewall rules shown in highlight. Responsive to this requested change, the NCV system may be invoked to verify whether the change alters the current control behavior of the network. In this example, the NCV system detects that the change will alter how the network controls at least one observed network flow in the network, and generates a visual warning 610 on the GUI. The warning 610 states that the proposed rule change will cause a recently observed packet flow to be blocked. The warning also provides a link that allows the user to view further details about the impacted flow (the "eni" identifier refers to a particular network interface that observed the impacted flow). In some embodiments, the link may take the user to a GUI for viewing the network flow logs collected for the network. As shown, the warning 610 is associated with a cancel button 620 and an override button 630. The cancel button 620 will cancel the requested change, while the override button 630 will cause the change to be implemented despite the warning.

FIG. 7 illustrates a user interface of the network management system that allows a user to review a list of network changes blocked by the NCV system, according to some embodiments.

In some embodiments, this user interface may be provided in response to a bulk deployment of many network configuration changes (e.g. as part of a large network reconfiguration). Such a bulk deployment of changes may be initiated from within the network management system or from an external system such as a third-party orchestration service. When the bulk deployment is performed, the NCV system may be used to verify every network change in the deployment and identify those changes are would alter the current control behavior of the network. In some embodiments, the entire deployment may be stopped if there are any problematic changes identified by the NCV system.

As shown in this example, the navigation view of the console indicates an item 710 in the drill down menu indicating that a prior bulk deployment included twelve network changes that were blocked. When this menu item is selected in the navigation view, the right side of the console shows a scrolling list of each individual change that was blocked by the NCV system. The user may click on individual changes in the list, and the console will display the warning 720 generated by the NCV system for that change. For example, warning 720 states that the selected change would cause a packet flow that was previously blocked to now be allowed, and provides a link to the network flow impacted by the change. The warning is provided with a number of buttons, which allow the reviewing user to approve or reject the change and move forward or backwards in the scrolling list.

Figure 8:
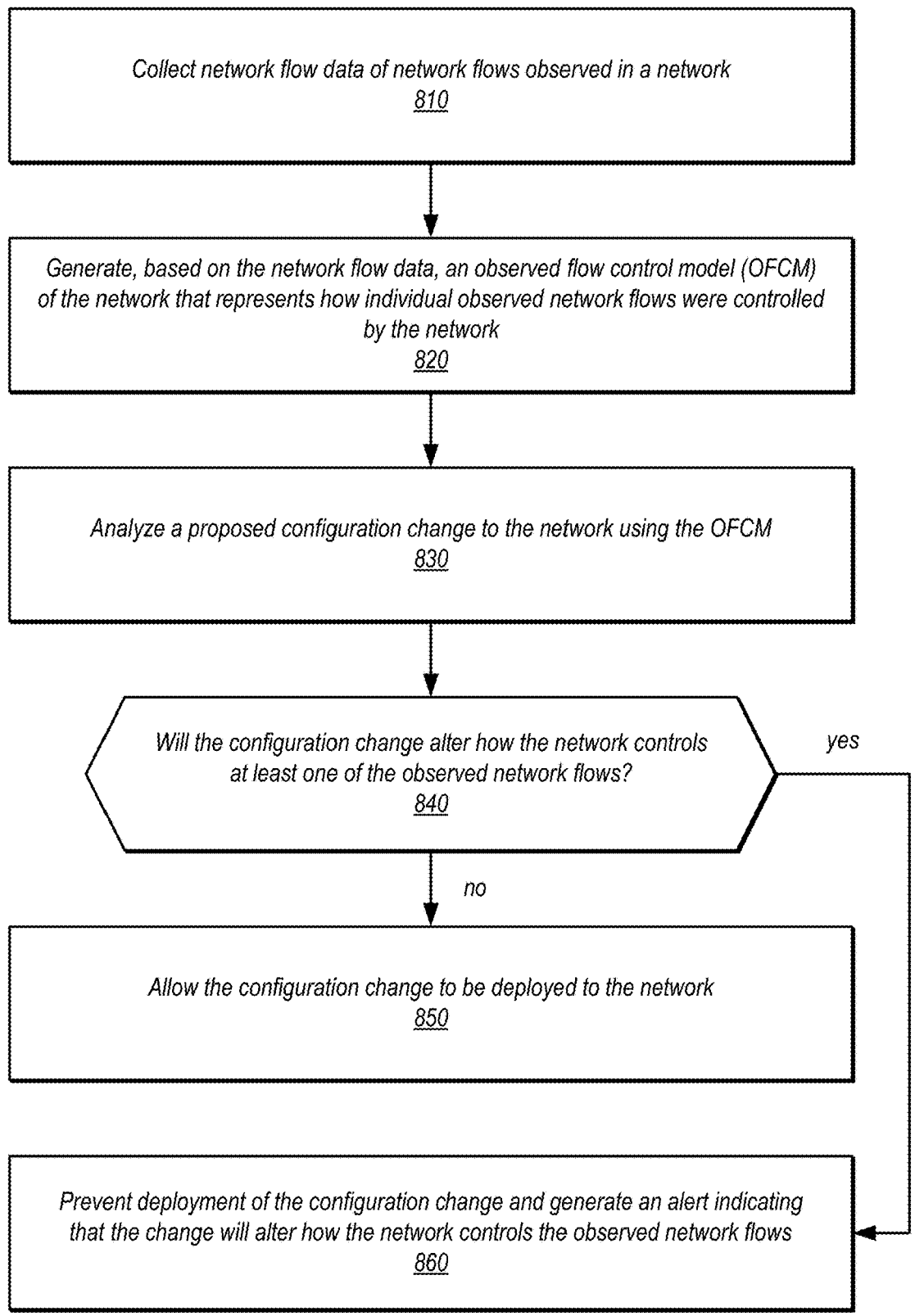
FIG. 8 is a flowchart illustrating a process of a NCV system analyzing a proposed configuration change on a network based on observed network traffic flows, according to some embodiments.

FIG. 8 is a flowchart illustrating a process of a NCV system analyzing a proposed configuration change on a network based on observed network traffic flows, according to some embodiments.

The process begins at operation 810, where network flow data (e.g. network flow data 112) of observed network flows (e.g. network flows 102) is collected from a network. Operation 810 may be performed by an embodiment of the network flow data collector 120 of FIG. 1. In some embodiments, the network flow data may be stored as network flow logs (e.g. network flow logs 122), which will indicate each observed flow as a log record. A network flow log record may indicate flow attributes such as the source and destination IP addresses, the source and destination ports, the protocol used, the receiving or sending network interface, the starting and ending times of the flow, and the number of bytes or packets transmitted in the flow, etc.

At operation 820, an observed flow control model (e.g. OFCM 140) is generated based on the network flow data. Operation 820 may be performed by an embodiment of the flow control model generator 130 of FIG. 1. The OFCM may be updated periodically, and may indicate how individual overbed network flows were controlled by the control elements of the network. For example, the OFCM may indicate that a particular flow was blocked or allowed at a firewall or access control list, or how another flow is routed or load balanced in the network. In some embodiments, the OFCM may be represented as a symbolic form, such as a logical formula (e.g. a Binary Decision Diagram or constraint program).

At operation 830, a proposed configuration change on the network is analyzed using the OFCM. The configuration change (e.g. proposed change 164) may be received via a network change verification interface to update one or more control elements in the network. This proposed change may be forwarded to the NCV system to be verified against observed flow logs, by a component such as the network change analyzer 150 of FIG. 1. In some embodiments, the analysis may occur in a manner as discussed in connection with FIG. 3. For example, the proposed change may be converted into the same symbolic form as the OFCM. The two data structures (e.g. logical formulas) may then be combined (e.g. using a constraint solver) to generate a third logical formula that identifies the subset of the network flow space that are handled differently by the two control models. The third logical formula may then be used to determine whether any observed network flows fall within this difference space (i.e. will be altered by the proposed configuration change).

At operation 840, a determination is made, as a result of the analysis, whether the proposed change will alter the way that the network controls at least one of the observed traffic flows. In some embodiments, the analysis may stop as soon as one impacted traffic low is identified. In some embodiments, the analysis will check all relevant network flows to determine all flows that will be altered by the configuration change.

If there are no observed network flows that will be altered by the configuration change, the process proceeds to operation 850, where the configuration change is allowed to be deployed or applied to the network. However, if there are network flows whose control will be altered by the configuration change, at operation 860, the NCV system will prevent deployment of the change, and generate a warning or alert (e.g. alert 172) indicating that fact. In some embodiments, the alert may be indicated visually on a GUI, as shown in FIGS. 5 and 6. The alert may indicate one or more example observed network flows that will be altered by the proposed change.

Figure 9:
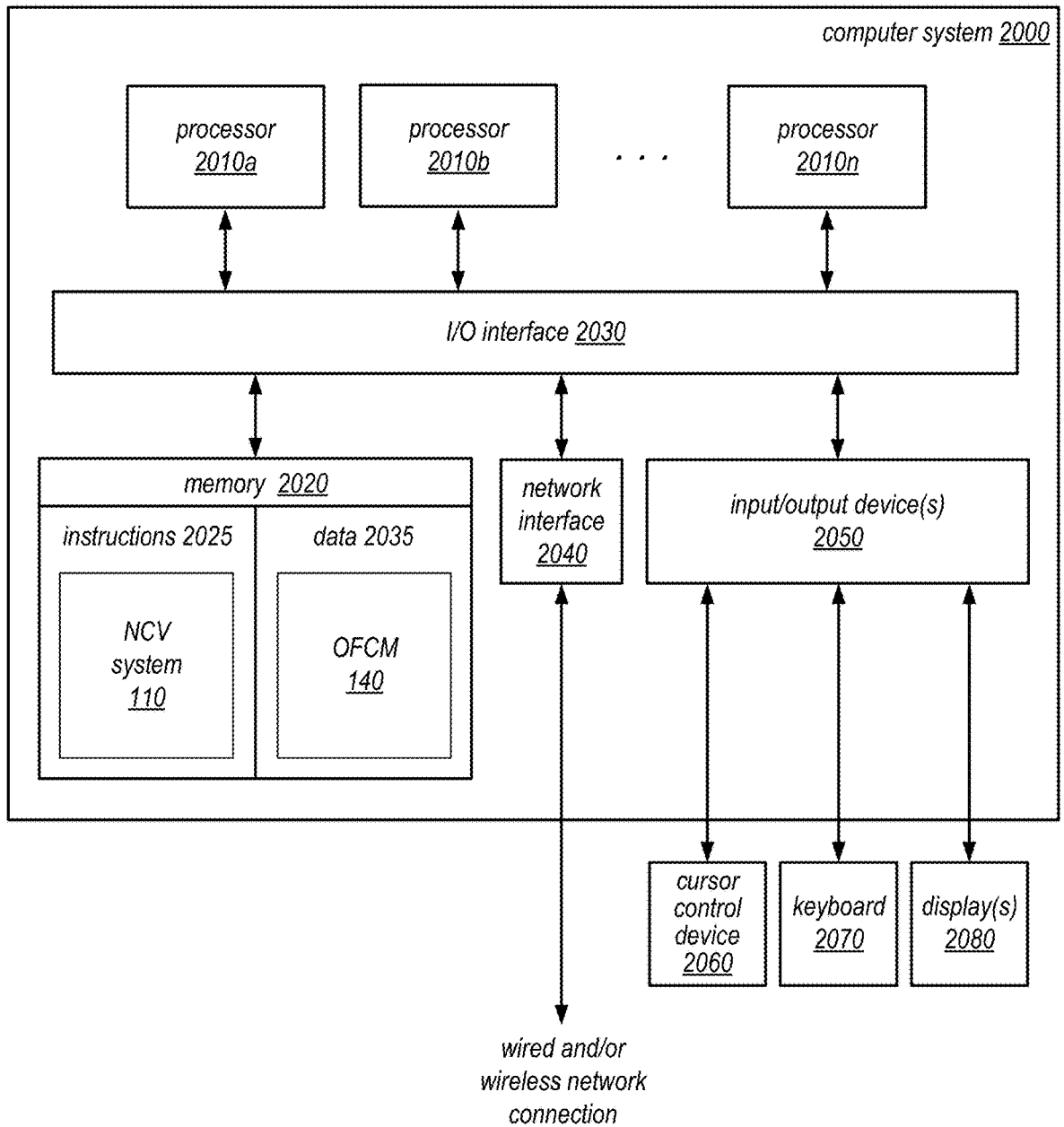
FIG. 9 illustrates an example computer system that implements portions of the NCV system described herein, according to some embodiments.

FIG. 9 illustrates an example computer system that implements portions of the NCV system described herein, according to some embodiments.

In different embodiments, computer system 2000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, computing system compute system, or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device 2060, keyboard 2070, and display(s) 2080. Display(s) 2080 may include standard computer monitor(s) and/or other display systems, technologies or devices. In at least some implementations, the input/output devices 2050 may also include a touch- or multi-touch enabled device such as a pad or tablet via which a user enters input via a stylus-type device and/or one or more digits. In some embodiments, it is contemplated that embodiments may be implemented using a single instance of computer system 2000, while in other embodiments multiple such systems, or multiple nodes making up computer system 2000, may host different portions or instances of embodiments. For example, in one embodiment some elements may be implemented via one or more nodes of computer system 2000 that are distinct from those nodes implementing other elements.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

In some embodiments, at least one processor 2010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 2020 may store program instructions and/or data accessible by processor 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 2020 as program instructions 2025 and data storage 2035, respectively. In other embodiments, program instructions and/or data may be received, sent or stored upon different types of computer-accessible media or on similar media separate from system memory 2020 or computer system 2000. Generally speaking, a non-transitory, computer-readable storage medium may include storage media or memory media such as magnetic or optical media, e.g., disk or CD/DVD-ROM coupled to computer system 2000 via I/O interface 2030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 2040.

In one embodiment, I/O interface 2030 may coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. In addition, in some embodiments some or all of the functionality of I/O interface 2030, such as an interface to system memory 2020, may be incorporated directly into processor 2010.

Network interface 2040 may allow data to be exchanged between computer system 2000 and other devices attached to a network, such as other computer systems, or between nodes of computer system 2000. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or retrieving data by one or more computer systems 2000. Multiple input/output devices 2050 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 2040.

As shown, memory 2020 may include program instructions 2025, may implement the various methods and techniques as described herein, and data storage 2035, comprising various data accessible by program instructions 2025. In one embodiment, program instructions 2025 may include software elements of embodiments as described herein and as illustrated in the figures. For example, the program instructions 2025 may be used to implement the functions of the NCV system 110. Data storage 2035 may include data that may be used in embodiments. For example, the data store 2035 may be used to store the OFCM 140 or the network flow logs 122. In other embodiments, other or different software elements and data may be included.

Those skilled in the art will appreciate that computer system 2000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. For example, leader nodes within a data warehouse system may present data storage services and/or database services to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention encompass all such modifications and changes and, accordingly, the above description to be regarded in an illustrative rather than a restrictive sense.

What is claimed is:

1. A system, comprising:
one or more computing devices that implement a network change verification (NCV) system, configured to:
collect network flow data of a plurality of network flows observed in a network;
generate, based at least in part on the network flow data, an observed flow control model (OFCM) of the network that represents how individual ones of the observed network flows were controlled by the network, wherein the OFCM includes one or more mapping functions that map individual observed network flows to resulting control actions;
analyze a proposed configuration change to the network using the OFCM to determine that the proposed configuration change will alter how the network controls at least one of the observed network flows; and
generate an alert indicating that the proposed configuration change will alter how the network controls at least one of the observed network flows.

2. The system of claim 1, wherein:
the NCV system is implemented as part of a network-accessible provider service;
the network-accessible provider service hosts client networks of virtual machines on behalf of clients, wherein the client networks are overlaid on a substrate network of the network-accessible provider service; and
the NCV system is configured to analyze network change requests for the client networks submitted to the network-accessible provider service.

3. The system of claim 1, wherein:
the NCV system implements a user interface configured to receive a request to deploy the proposed configuration change, and
the alert is generated via the user interface and indicates a particular network flow altered by the proposed configuration change.

4. The system of claim 1, wherein the proposed configuration change to the network includes:
a change to a firewall rule,
a change to a routing table,
a change to an access control list, or
a change to a load balancing policy.

5. The system of claim 1, wherein:
the OFCM of the network is a generated as a first logical formula; and
to determine that the proposed configuration change will alter how the network controls at least one of the observed network flows, the NCV system is configured to:
generate a second logical formula that reflects the proposed configuration change; and
generate a third logical formula based on a combination of the first and second logical formulas, wherein the third logical formula identifies network flows that produce different control outcomes under the first and second logical formulas; and
using the third logical formula to identified the at least one observed network flow altered by the proposed configuration change.

6. A method, comprising:
performing, by a network change verification (NCV) system implemented by one or more computing devices:
collecting network flow data of a plurality of network flows observed in a network;
generating, from the network flow data, an observed flow control model (OFCM) of the network that represents how individual ones of the observed network flows were controlled by the network, wherein the OFCM includes one or more mapping functions that map individual observed network flows to resulting control actions;
receiving a request for a configuration change to the network, and in response:
determining, based at least in part on the OFCM, that the configuration change will alter how the network controls at least one of the observed network flows;
preventing the configuration change from being applied to the network; and
generating an alert indicating that the configuration change will alter how the network controls at least one of the observed network flows.

7. A method of claim 6, wherein:
the alert is generated via a user interface of the NCV system; and
the method further comprises:
receiving user approval of the configuration change via the user interface after the alert; and
allowing the configuration change to be applied after the user approval.

8. The method of claim 6, wherein:
the NCV system implements a configuration interface; and
the method further comprises receiving configuration input via the configuration interface, wherein the configuration input specifies to enable or disable network change verification for a particular control element of the network.

9. The method of claim 6, wherein the alert indicates a particular one of the observed network flows that is altered by the configuration change.

10. The method of claim 9, wherein:
the altered network flow was blocked by the network without the configuration change; and
the alert indicates the altered network flow is no longer blocked as a result of the configuration change.

11. The method of claim 6, wherein one or more mapping functions are stored in one or more lookup tables, wherein multiple observed network flows with same flow attributes and observed at different times are merged.

12. The method of claim 6, further comprising periodically updating the OFCM based at least in part on network flow data of newly observed network flows in the network.

13. The method of claim 6, further comprising:
receiving configuration input specifying a particular time period of network flows to use to generate the OFCM; and
wherein the OFCM is generated based at least in part on network flow data from the particular time period.

14. The method of claim 6, further comprising:
receiving configuration input specifying to exclude a particular control element during generation of the OFCM; and
wherein the OFCM is generated without including network flows observed by the particular control element.

15. One or more non-transitory computer-readable storage media storing program instructions that when executed on or across one or more processors implement a network change verification (NCV) system and cause the NCV system to:
collect network flow data of a plurality of network flows observed in a network;
generate, from the network flow data, an observed flow control model (OFCM) of the network that represents how individual ones of the observed network flows were controlled by the network, wherein the OFCM includes one or more mapping functions that map individual observed network flows to resulting control actions;
receive a request for a configuration change to the network, and in response:
determine, based at least in part on the network flow data, that the configuration change will alter how the network controls at least one of the observed network flows;
prevent the configuration change from being applied to the network; and
generate an alert indicating that the configuration change will alter how the network controls at least one of the observed network flows.

16. The one or more non-transitory computer-readable storage media of claim 15, wherein the one or more mapping functions are stored in one or more hash tables that map combinations of flow attributes of network flows to observed control outcomes.

17. The one or more non-transitory computer-readable storage media of claim 15, wherein the OFCM includes one or more Binary Decision Diagrams or one or more constraint programs.

18. The one or more non-transitory computer-readable storage media of claim 15, wherein the OFCM includes one or more Bloom filters.

19. The one or more non-transitory computer-readable storage media of claim 15, wherein the alert indicates that a particular one of the observed network flows is no longer blocked as a result of the configuration change.

20. The one or more non-transitory computer-readable storage media of claim 15, wherein:
   the alert is generated via a user interface of the NCV system; and
   the program instructions when executed on or across one or more processors cause the NCV system to:
      receive user approval of the configuration change via the user interface after the alert; and
      allow the configuration change to be applied after the user approval.

\* \* \* \* \*